(12) United States Patent
Beser

(10) Patent No.: US 7,991,888 B1
(45) Date of Patent: Aug. 2, 2011

(54) SYSTEMS AND METHODS FOR ORDERED INITIALIZATION OF CABLE MODEMS

(75) Inventor: Nurettin Burcak Beser, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 2425 days.

(21) Appl. No.: 10/667,978

(22) Filed: Sep. 23, 2003

Related U.S. Application Data

(60) Provisional application No. 60/412,814, filed on Sep. 24, 2002.

(51) Int. Cl.
G06F 15/173 (2006.01)
G06F 15/177 (2006.01)
H04H 60/45 (2008.01)
H04L 12/28 (2006.01)

(52) U.S. Cl. ........ 709/226; 709/220; 709/221; 709/222; 725/111; 370/395.21

(58) Field of Classification Search .................. 709/226, 709/220–222; 725/111; 370/395.21
See application file for complete search history.

(56) References Cited

U.S. PATENT DOCUMENTS

| 6,230,326 | B1 * | 5/2001 | Unger et al. | 725/111 |
|---|---|---|---|---|
| 6,453,472 | B1 * | 9/2002 | Leano et al. | 725/111 |
| 6,553,568 | B1 * | 4/2003 | Fijolek et al. | 725/111 |
| 6,614,799 | B1 * | 9/2003 | Gummalla et al. | 370/448 |
| 6,912,221 | B1 * | 6/2005 | Zadikian et al. | 370/395.21 |
| 7,068,712 | B1 * | 6/2006 | Zang et al. | 375/222 |
| 7,107,326 | B1 * | 9/2006 | Fijolek et al. | 709/220 |
| 2001/0038647 | A1 * | 11/2001 | Bernath et al. | 370/503 |
| 2001/0039582 | A1 * | 11/2001 | McKinnon et al. | 709/226 |
| 2002/0062486 | A1 * | 5/2002 | Park | 725/111 |
| 2003/0035442 | A1 * | 2/2003 | Eng | 370/486 |
| 2004/0034871 | A1 * | 2/2004 | Lu et al. | 725/111 |

* cited by examiner

*Primary Examiner* — Philip J Chea
(74) *Attorney, Agent, or Firm* — Harrity & Harrity, LLP

(57) ABSTRACT

A system allocates upstream resources to multiple cable modems subsequent to a cable modem termination system (CMTS) re-boot. The system groups the multiple cable modems into multiple groups. The system orders, subsequent to the CMTS re-boot, allocation of upstream resources to each of the multiple cable modems based on the group to which each of the cable modems belongs. The system allocates upstream resources to each of the cable modems based on the ordering.

30 Claims, 8 Drawing Sheets

SYSTEMS AND METHODS FOR ORDERED INITIALIZATION OF CABLE MODEMS

CROSS REFERENCE TO RELATED APPLICATION

The instant application claims priority from provisional application No. 60/412,814, filed Sep. 24, 2002, the disclosure of which is incorporated by reference herein in its entirety.

BACKGROUND OF THE INVENTION

1. Field of the Invention

The present invention relates generally to cable modem systems and, more particularly, to systems and methods for ordering the initialization and registration of cable modems in cable modem systems.

2. Description of Related Art

In conventional cable modem systems, a cable modem termination system (CMTS) at the headend typically services multiple cable modems (CMs). The CMTS transmits data and messages to the CMs on a downstream frequency and receives data bursts from the CMs on different upstream frequencies. The CMTS transmits data and messages to CMs that cause the CMs to initialize and then register with it via a registration process. Initialization and registration typically occurs when new CMs are added to a cable network, or when the CMTS re-boots due to system failures or power outages.

In the case of a CMTS re-boot, each CM must initialize and re-register with the CMTS to resume service. This initialization and re-registration involves the transmission of channel resource requests from each CM to the servicing CMTS. Conventionally, the initialization and re-registration process subsequent to a CMTS re-boot involved a "free-for-all" in which every CM attempted to initialize and re-register at nearly the same time. This "free-for-all" resulted in severe channel contention and a substantial delay in CM initialization and registration. The severe channel contention, thus, delayed the resumption of service to CM-using customers after a CMTS re-boot.

Therefore, there is a need in the art to more efficiently implement CM initialization and registration, subsequent to a CMTS re-boot, that reduces channel contention and reduces delays in resumption of service to cable modem system customers.

SUMMARY OF THE INVENTION

Systems and methods consistent with the principles of the invention address this and other needs by providing mechanisms for ordering the initialization and registration of CMs after a CMTS re-boot due to, for example, system failure and/or power outage. Consistent with the principles of the invention, data tables may be constructed that associate medium access control (MAC) addresses of CMs with order numbers that indicate an order in which the CMs may be initialized and registered. The order numbers may further be associated with initial upstream channels to which the CMs may be assigned subsequent to a CMTS re-boot.

CMs contained in the data tables may be grouped together based on, for example, quality of service (QoS) requirements of the CMs, with CMs of like QoS requirements being grouped together. Each group of CMs may then be assigned an order number in the data tables for initialization and registration. Some groups of CMs may be designated as deserving higher priority service and may, thus, be assigned lower order numbers than groups of CMs with lower priority, such that they may initialize and register before other groups of CMs. By ordering the initialization and registration process, systems and methods consistent with the principles of the invention may limit the demands upon upstream channel resources subsequent to CMTS re-boot, thus, reducing channel contention and reducing the time involved in resuming CM service to respective customers.

In accordance with one aspect of the invention as embodied and broadly described herein, a method of allocating upstream resources to multiple of cable modems includes grouping the multiple cable modems into multiple groups. The method further includes ordering allocation of upstream resources to each of the multiple cable modems based on the group to which each of the cable modems belongs. The method also includes allocating upstream resources to each of the cable modems based on the ordering.

In another implementation consistent with principles of the invention, a method of allocating upstream resources in a cable modem system includes receiving upstream resource requests from multiple cable modems, each of the resource requests including an address associated with a cable modem of the multiple cable modems. The method further includes determining an order that the upstream resources are to be assigned to each of the multiple cable modems based on the address of each of the resource requests. The method also includes allocating the upstream resources based on the determined order.

In still another implementation consistent with principles of the invention, a method of initializing cable modems subsequent to a cable modem termination system re-boot includes receiving initial upstream channel requests from multiple modems. The method further includes retrieving first data from each of the requests and determining an order in which to assign upstream channels to each of the multiple modems based on the retrieved first data.

BRIEF DESCRIPTION OF THE DRAWINGS

The accompanying drawings, which are incorporated in and constitute a part of this specification, illustrate exemplary embodiments of the invention and, together with the description, explain the invention. In the drawings.

DETAILED DESCRIPTION

The following detailed description of the invention refers to the accompanying drawings. The same reference numbers may be used in different drawings to identify the same or similar elements. Also, the following detailed description does not limit the invention. Instead, the scope of the invention is defined by the appended claims and equivalents.

Systems and methods consistent with the principles of the invention implement mechanisms for ordering the initialization and registration of CMs after a CMTS re-boot that may occur as a result of a system failure and/or power outage. Prior to the CMTS re-boot, CMs may be grouped together based on, for example, quality of service (QoS) requirements of the CMs. For example, CMs of like QoS requirements may be grouped together. Each group of CMs may then be assigned an order number for initialization and registration. Some groups of CMs may be assigned lower order numbers than other groups of CMs, such that they may initialize and register before the other groups. By ordering the initialization and registration process, systems and methods consistent with the principles of the invention may reduce channel contention and reduce the time involved in resuming CM service to respective customers subsequent to a CMTS re-boot.

Exemplary Network

Figure 1:
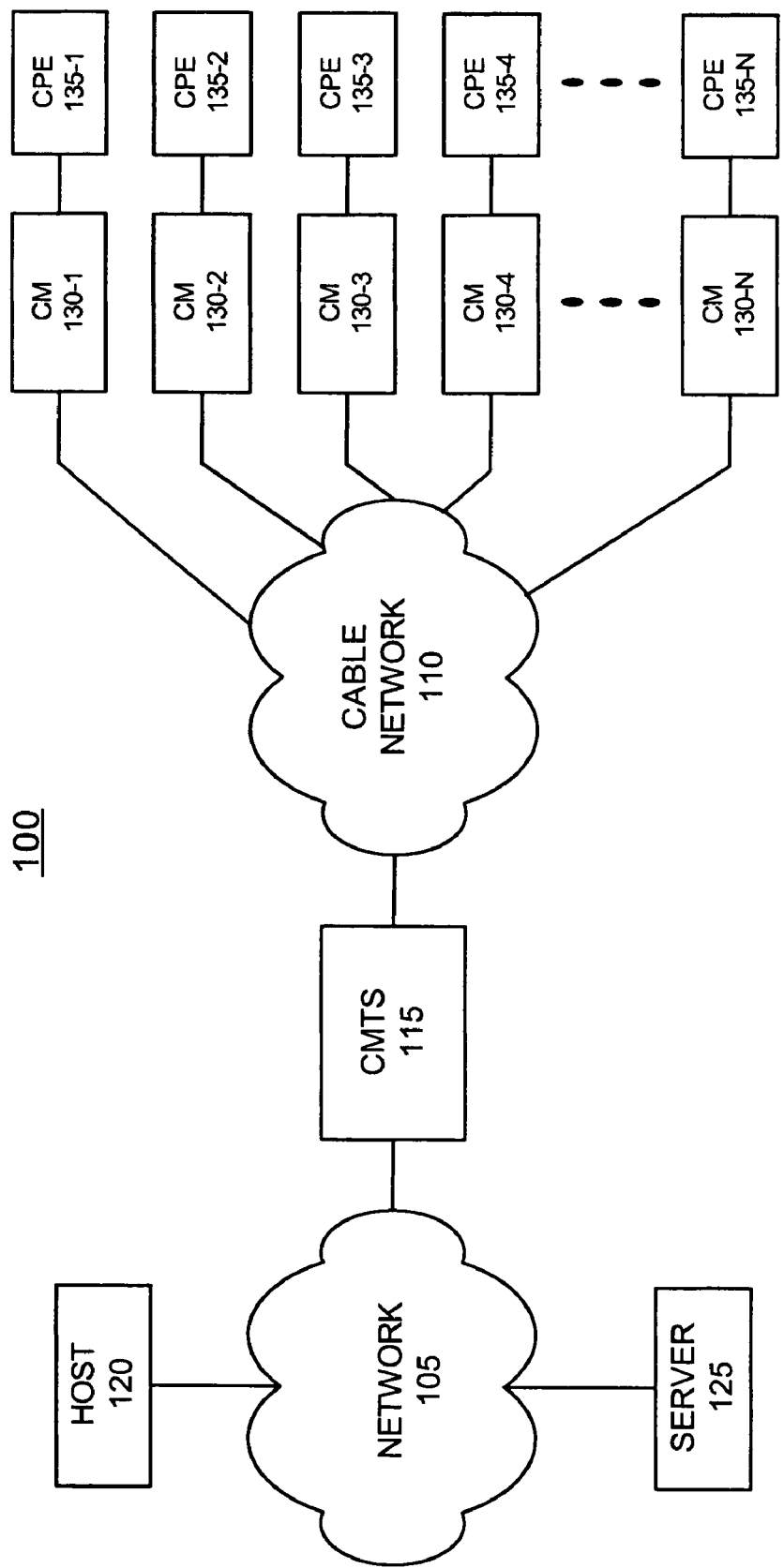
FIG. 1 is a diagram of an exemplary network in which systems and methods consistent with the principles of invention may be implemented.

FIG. 1 is a diagram of an exemplary network 100 in which systems and methods consistent with the principles of the invention may be implemented. Network 100 may include sub-network 105 and cable sub-network 110 interconnected via a CMTS 115. Host 120 and server 125 may connect with sub-network 105 via wired, wireless or optical connection links. Sub-network 105 can include one or more networks of any type, including a Public Land Mobile Network (PLMN), Public Switched Telephone Network (PSTN), local area network (LAN), metropolitan area network (MAN), wide area network (WAN), Internet, or Intranet. The PLMN may include packet-switched sub-networks, such as, for example, General Packet Radio Service (GPRS), Cellular Digital Packet Data (CDPD), and Mobile IP sub-networks.

Cable sub-network 110 may include a coaxial or hybrid optical fiber/coaxial (HFC) cable network. Cable modems 130-1 through 130-N may interconnect with cable sub-network 110 via coaxial cable/optical fiber. Each cable modem 130 couples with a respective Customer Premises Equipment (CPE) 135. Each cable modem 130 may include a message transferring agent (MTA) that may receive packet-switched data from sub-network 105 and may store and forward packets from a respective CPE 135. Such packet-switched data may include, for example, Voice Over Internet Protocol (VOIP) data. Each CPE 135 may include a television, a computer, a telephone, or any other type of equipment that can receive and/or send data via cable sub-network 110.

CMTS 115 may transmit data received from host 120 or server 125 on one or more downstream channels via cable network 110 to cable modems 130. Cable modems 130 may receive the downstream transmissions and pass the demodulated transmissions on to respective CPEs 135. Cable modems 130 may further receive data from respective CPEs 135, modulate the data, and transmit the data on one or more upstream channels to CMTS 115 via cable network 110. CMTS 115 may forward the data, via sub-network 105, to host 120 or server 125.

It will be appreciated that the number of components illustrated in FIG. 1 is provided for explanatory purposes only. A typical network may include more or fewer components than are illustrated in FIG. 1.

Exemplary Cable Modem Termination System

Figure 2:
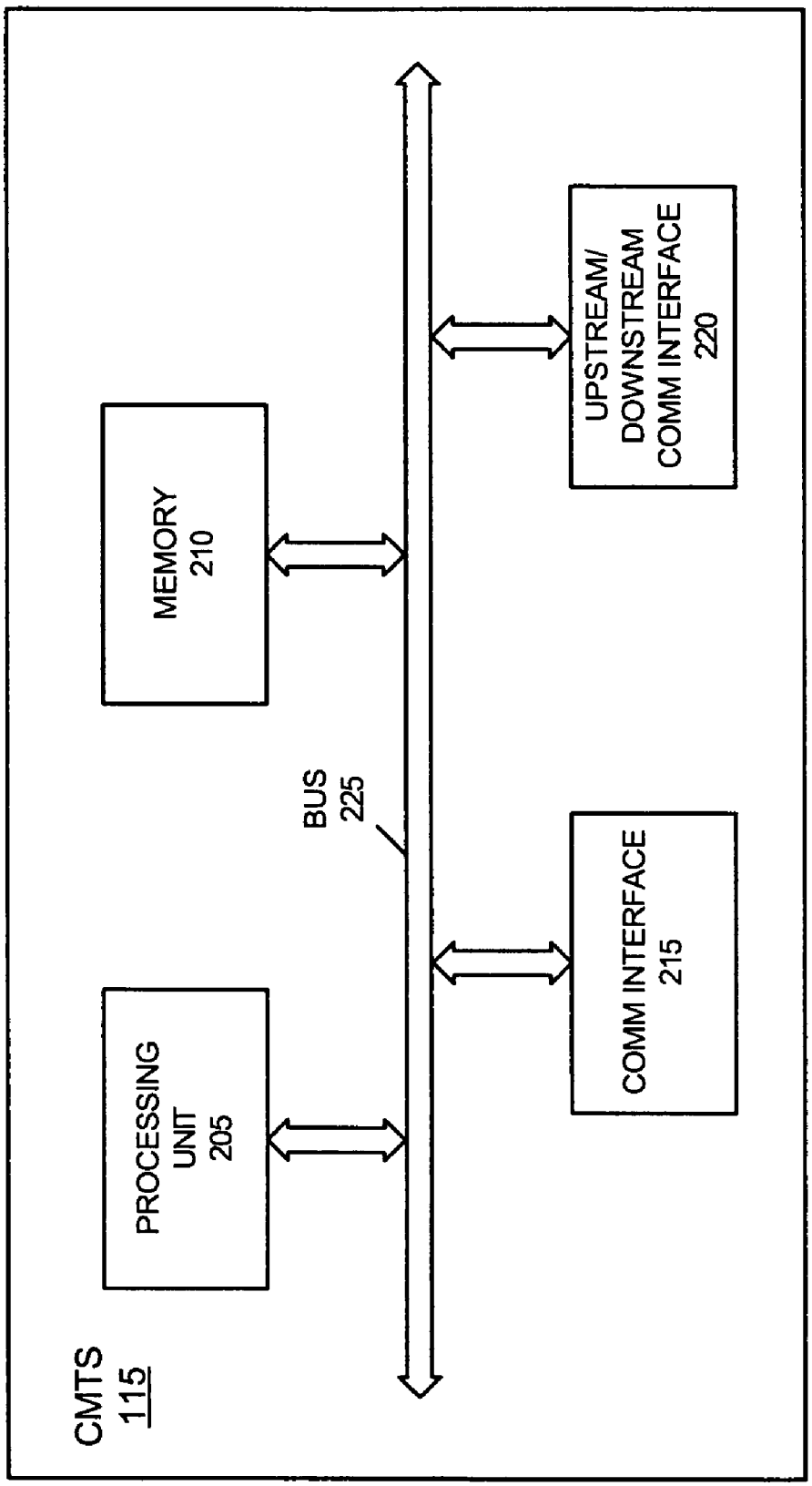
FIG. 2 is a diagram of an exemplary cable modem termination system (CMTS) according to an implementation consistent with the principles of invention.

FIG. 2 illustrates a diagram of an exemplary CMTS 115 according to an implementation consistent with the principles of the invention. CMTS 115 may include a processing unit 205, a memory 210, a communication interface 215, an upstream/downstream communication interface 220, and a bus 225.

Processing unit 205 may perform data processing functions for data transmitted/received via communication interface 215 to/from sub-network 105, and data transmitted/received via upstream/downstream communication interface 220 to/from cable sub-network 110. Memory 210 may include Random Access Memory (RAM) that provides temporary working storage of data and instructions for use by processing unit 205 in performing control and processing functions. Memory 210 may additionally include Read Only Memory (ROM) that provides permanent or semi-permanent storage of data and instructions for use by processing unit 205. Memory 210 can also include large-capacity storage devices, such as a magnetic and/or optical recording medium and its corresponding drive.

Communication interface 215 may include conventional circuitry well known to one skilled in the art for transmitting data to, or receiving data from, sub-network 105. Upstream/downstream communication interface 220 may include transceiver circuitry well known to one skilled in the art for transmitting data bursts on downstream channels, and receiving data bursts on upstream channels, via cable sub-network 110. Such transceiver circuitry may include amplifiers, filters, modulators/demodulators, interleavers, error correction circuitry, and other conventional circuitry used to convert data into radio frequency (RF) signals for transmission via cable sub-network 110, or to interpret data bursts received from cable modems 130 via cable sub-network 110 as data symbols.

Bus 225 interconnects the various components of CMTS 115 to permit the components to communicate with one another.

Exemplary Cable Modem

Figure 3:
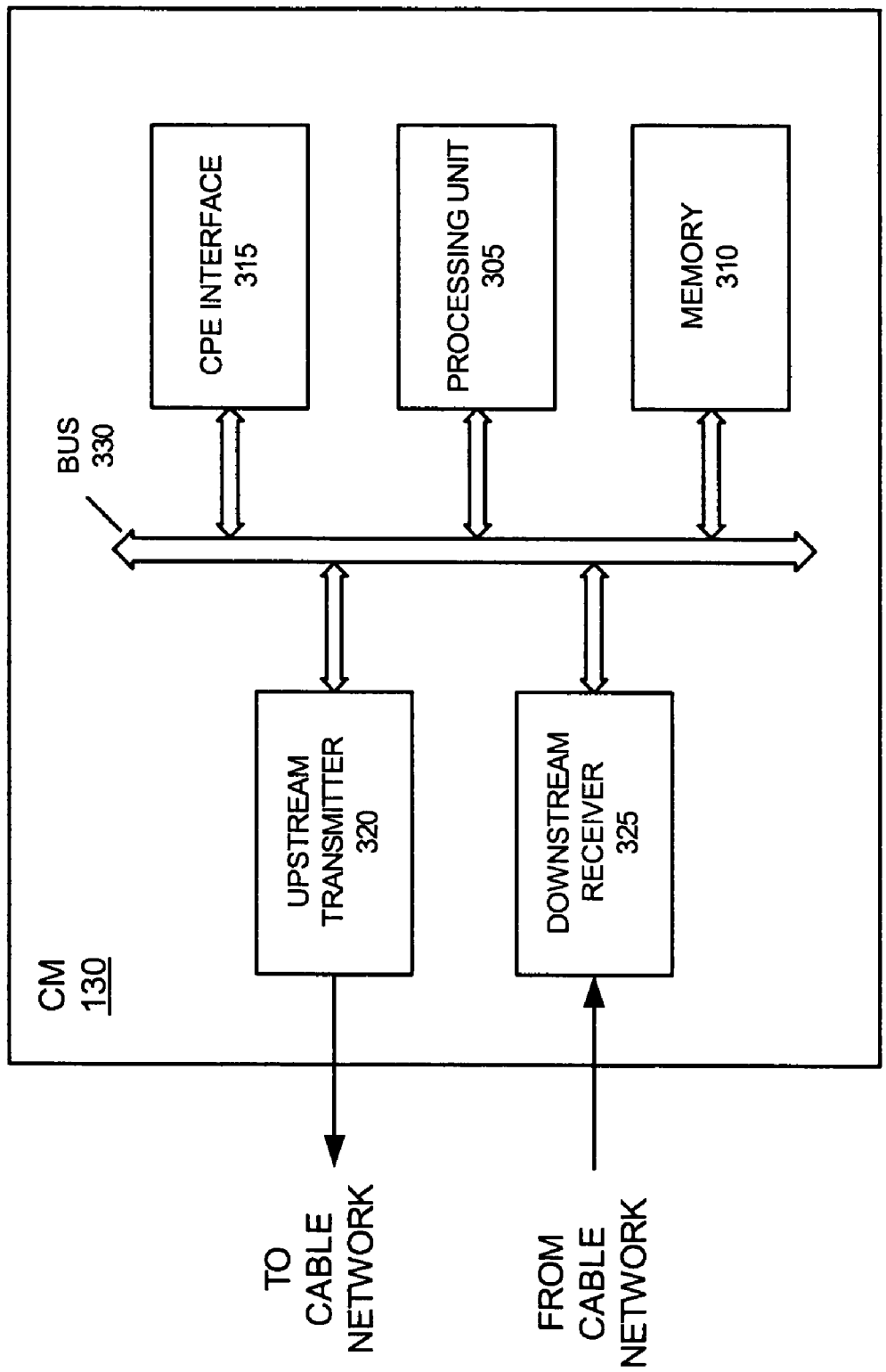
FIG. 3 is a diagram of an exemplary cable modem (CM) according to an implementation consistent with the principles of invention.

FIG. 3 illustrates a diagram of an exemplary CM 130 according to an implementation consistent with the principles of the invention. CM 130 may include a processing unit 305, a memory 310, a CPE interface 315, an upstream transmitter 320, a downstream receiver 325, and a bus 330. Upstream transmitter 320 and downstream receiver 325 may be physically embodied in a single interface module.

Processing unit 305 may perform data processing functions for data received via downstream receiver 325 and data transmitted via upstream transmitter 320. Memory 310 may include RAM that provides temporary working storage of data and instructions for use by processing unit 305 in performing control and processing functions. Memory 310 may additionally include ROM that provides permanent or semi-permanent storage of data and instructions for use by processing unit 305. Memory 310 can also include large-capacity storage devices, such as a magnetic and/or optical recording medium and its corresponding drive.

CPE interface 315 may include circuitry well known to one skilled in the art for interfacing with a CPE 135. Upstream transmitter 320 may include circuitry well known in the art for transmitting on an upstream channel. For example, upstream transmitter 320 may include amplifiers, filters, modulators, interleavers, error correction circuitry, and other conventional circuitry used to convert data into RF signals for transmission via cable sub-network 110. Downstream receiver 325 may include circuitry well known to one skilled in the art for receiving data bursts on a downstream channel. For example, downstream receiver 325 may include amplifiers, filters, demodulators and other conventional circuitry used to interpret data bursts received from CMTS 115 as data symbols.

Bus 330 interconnects the various components of CM 130 to permit the components to communicate with one another.

Exemplary Downstream/Upstream Communication

Figure 4:
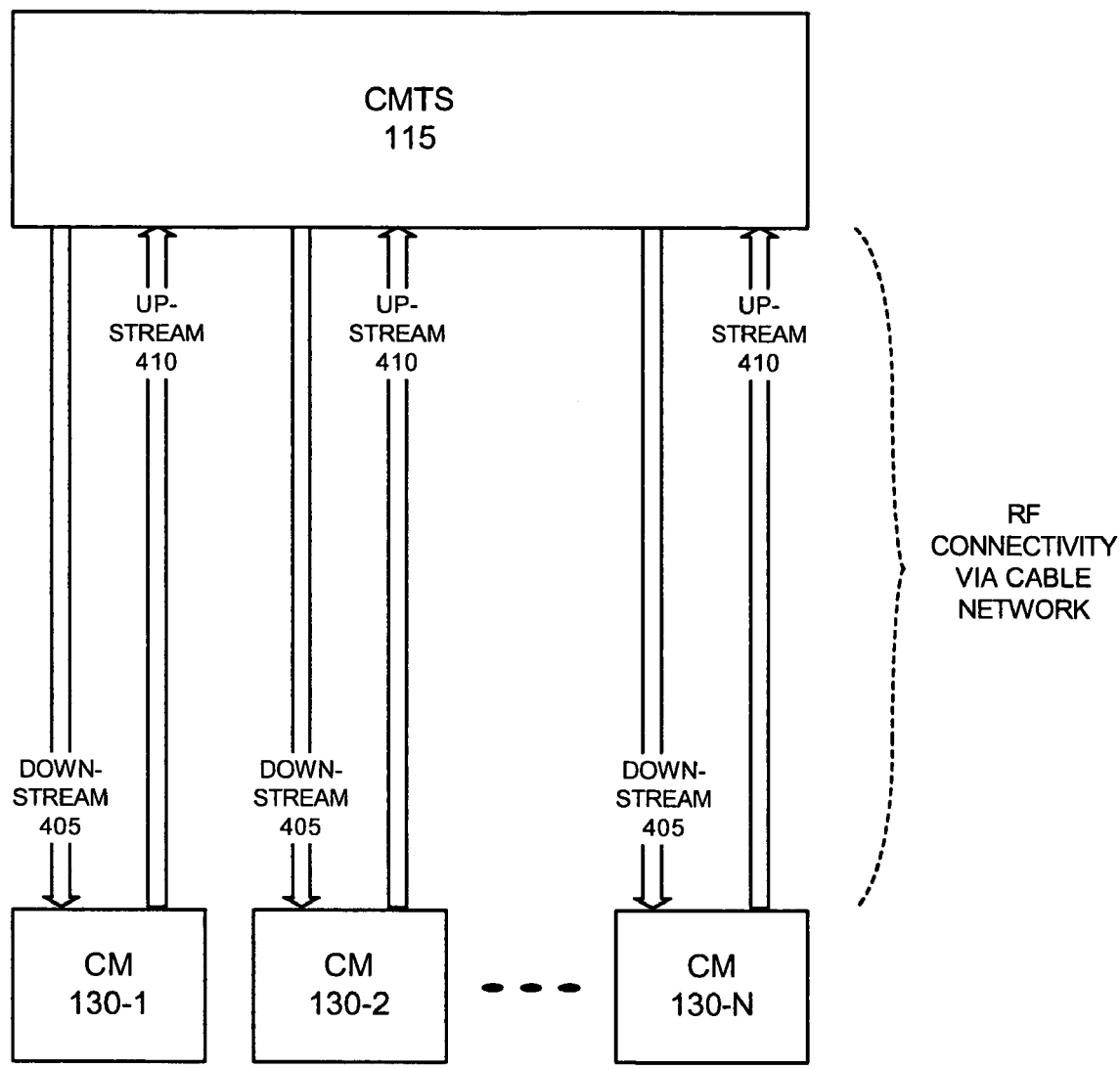
FIG. 4 is a diagram of exemplary upstream/downstream communications between a CMTS and multiple cable modems according to an implementation consistent with the principles of invention.

FIG. 4 illustrates exemplary upstream and downstream communication between a CMTS 115 and multiple CMs 130 according to an implementation consistent with the principles of the invention. As illustrated in FIG. 4, CMTS 115 and CMs 130-1 through 130-N interconnect via downstream RF channels 405 and upstream RF channels 410 of cable sub-network 110. Each downstream channel 405 and upstream channel 410 may be on the same physical communications medium and may include a different frequency. CMTS 115 may transmit messages and data to each CM 130 on a downstream channel 405 and may receive transmission from each CM 130 via an upstream channel 410. Each upstream channel 410 may include multiple "virtual" channels. Each virtual upstream channel may include a time division multiplexed (TDM) timeslot of the upstream channel frequency, for example. Each virtual upstream channel may further be associated with different transmission characteristics of CMs 130. Such different transmission characteristics may include a different channel profile, such as different TDM timeslot size, symbol rate, frequency, pre-amble pattern, and/or burst profile. The different burst profile may include a different modulation, pre-amble length, data block size (e.g., Reed-Solomon block size), error correction (e.g., Reed-Solomon error correction), scrambling or encryption, encoding (e.g., differential encoding), maximum burst size, and/or guard time size. Upstream channels 410 from cable modems 130-1 through 130-N may, thus, include frequency bandwidth divided into multiple channels, with each channel possibly further time division multiplexed into multiple virtual upstream channels.

Exemplary Upstream Channel Descriptor

Figure 5:
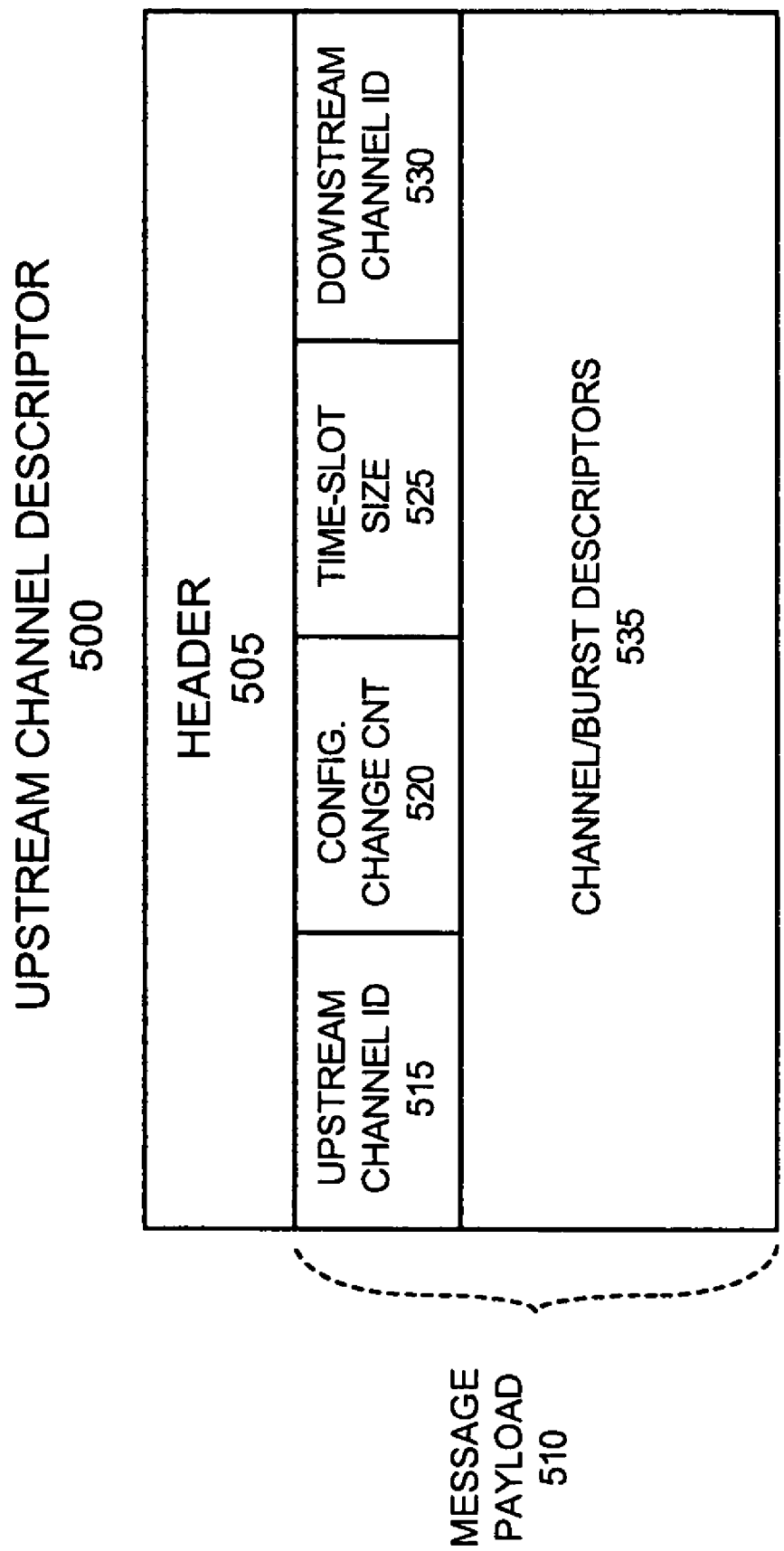
FIG. 5 is a diagram of an exemplary upstream channel descriptor according to an implementation consistent with the principles of the invention.

FIG. 5 illustrates an exemplary upstream channel descriptor (UCD) 500, one or more of which may be periodically transmitted from CMTS 115 to CMs 130, according to an implementation consistent with the principles of the invention. UCD 500 may include a header 505 and a message payload 510. Header 505 may include conventional overhead data for the use of any type of MAC protocol.

Message payload 510 may include an upstream channel identifier 515, a configuration change count 520, a time-slot size 525, a downstream channel identifier 530 and channel/burst descriptors 535. Upstream channel identifier 515 may identify the upstream channel that is associated with this UCD 500. Configuration change count 520 may indicate when any values of this UCD 500 change. If the value of count 520 remains the same in a subsequent UCD, a receiving CM 130 can conclude that the remaining fields of UCD 500 have not changed, and may disregard the remainder of the message. Time-slot size 525 may indicate the size T of the time-slot for the upstream channel identified by upstream channel identifier 515. T may include integer multiples of 2 (e.g., T=2M).

Downstream channel identifier 530 may indicate the downstream channel on which UCD 500 has been transmitted. Burst/channel descriptors 535 may indicate channel and burst profiles for CM transmission on the channel identified by upstream channel identifier 515. The channel profile may include symbol rate, frequency and pre-amble pattern. The burst profile may include modulation (e.g., QPSK or 16AM), pre-amble length, data block size, error correction, scrambling or encryption, encoding, maximum burst size, and guard time size.

Exemplary MAC Address/VCID Tables

Figure 6:
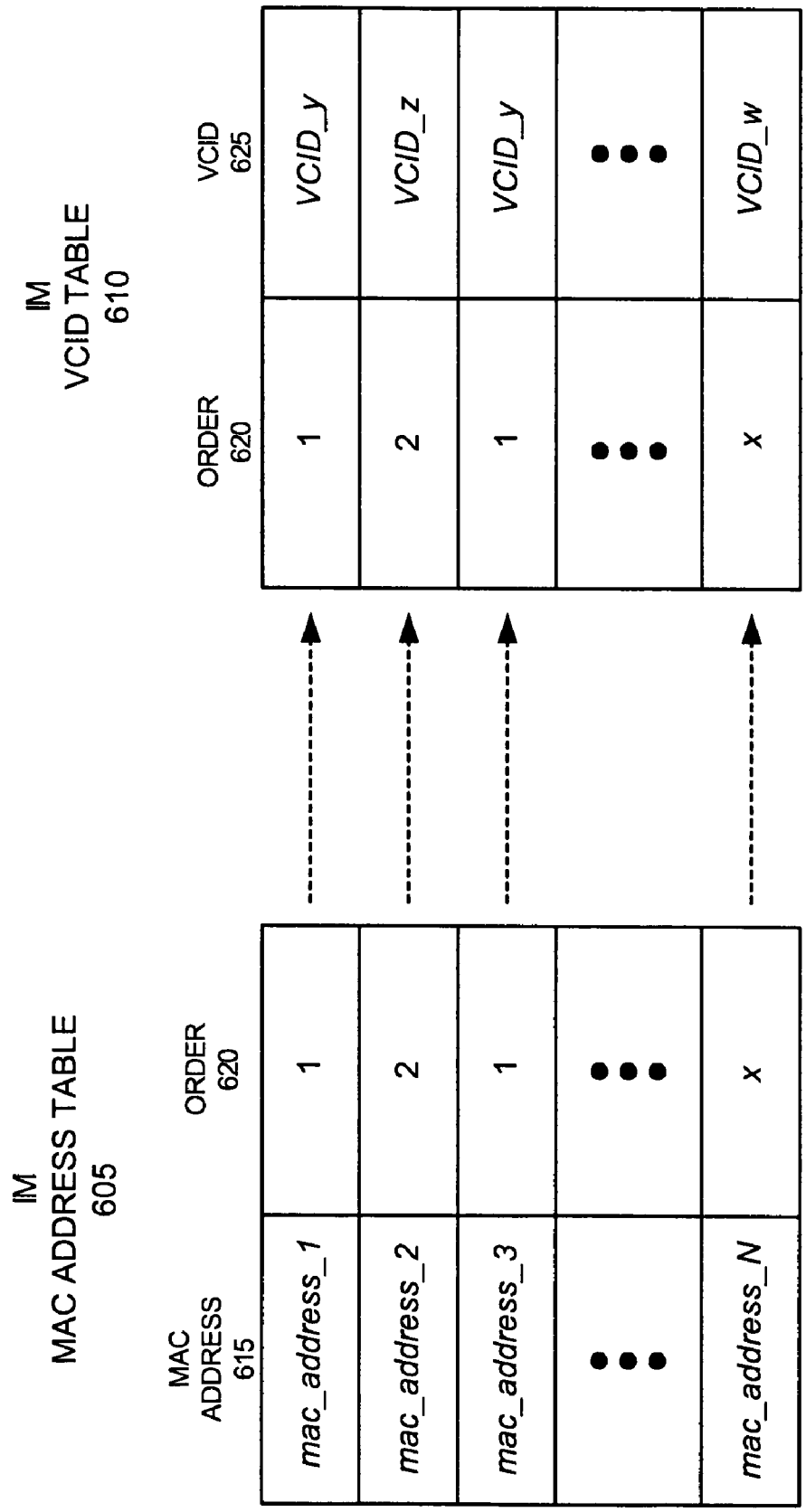
FIG. 6 is a diagram of an exemplary medium access control address table and a virtual channel identifier table consistent with the principles of the invention.

FIG. 6 illustrates an exemplary initial maintenance (IM) MAC address table 605 and virtual channel identifier (VCID) table 610 that may be stored in memory 210 of CMTS 115 consistent with the principles of the invention. MAC address table 605 may include multiple MAC addresses 615 and respective order numbers 620. Each MAC address 615 corresponds to a CM 130 that has previously registered with CMTS 115. Each CM 130 includes its MAC address in messages sent to CMTS 115 for requesting upstream channel allocation. Each order number 620 indicates an order in which each CM 130, corresponding to an associated MAC address 615, may be allocated an upstream channel for initialization and/or registration.

VCID table 610 may include multiple order numbers 620 and respective VCIDs 625. Each of VCIDs 625 in VCID table 610 corresponds to a virtual upstream channel to which a CM 130 may be initialized. MAC address table 605 and VCID table 610 may, thus, map CM 130 MAC addresses to upstream channels on which the CMs 130 may be initialized according to an order specified by corresponding order numbers 620.

Exemplary CM Initialization and Registration Ordering Process

Figure 7:
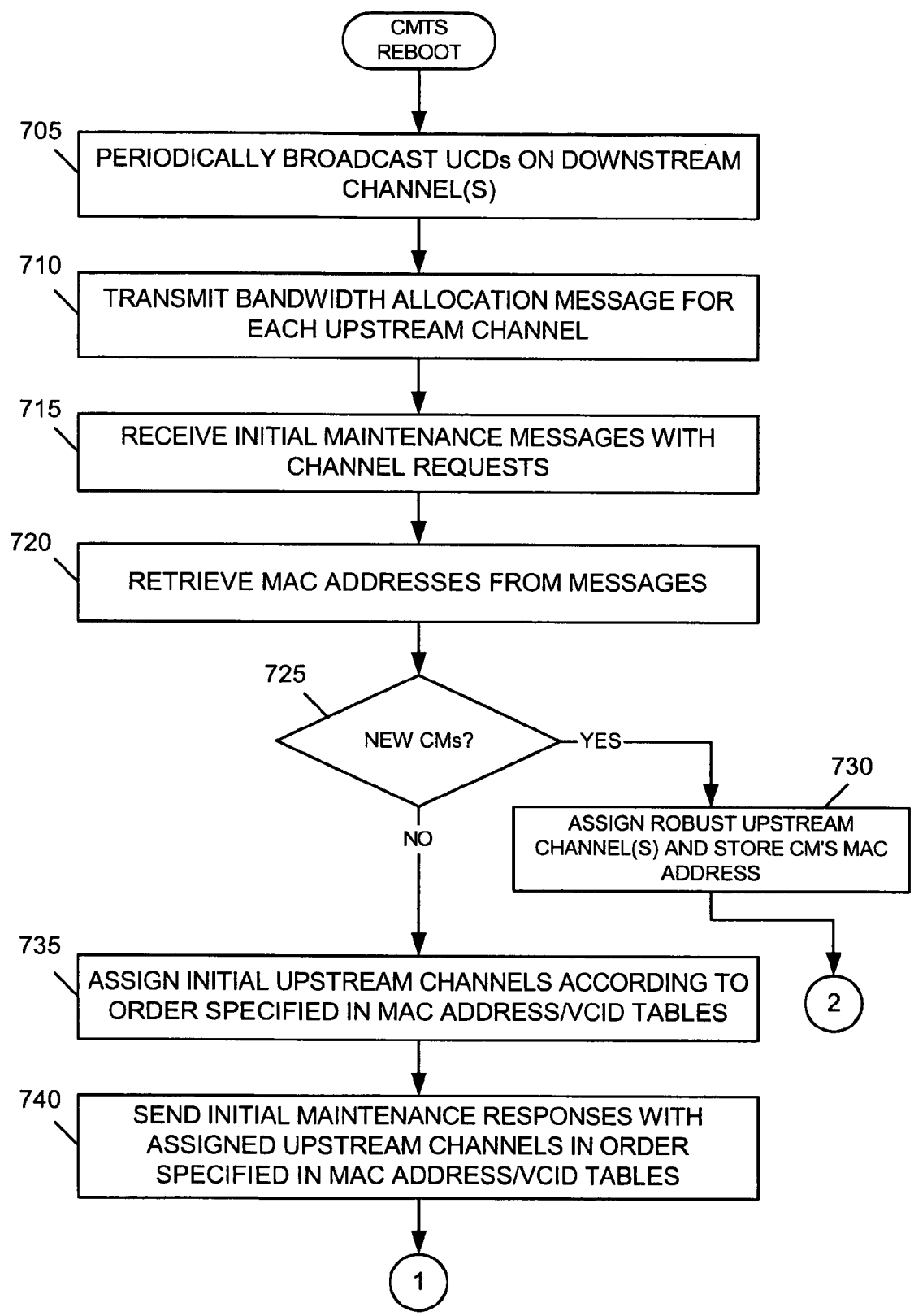
FIGS. 7-8 are flow charts that illustrate an exemplary CM initialization and registration ordering process according to an implementation consistent with the principles of the invention.
Figure 8:
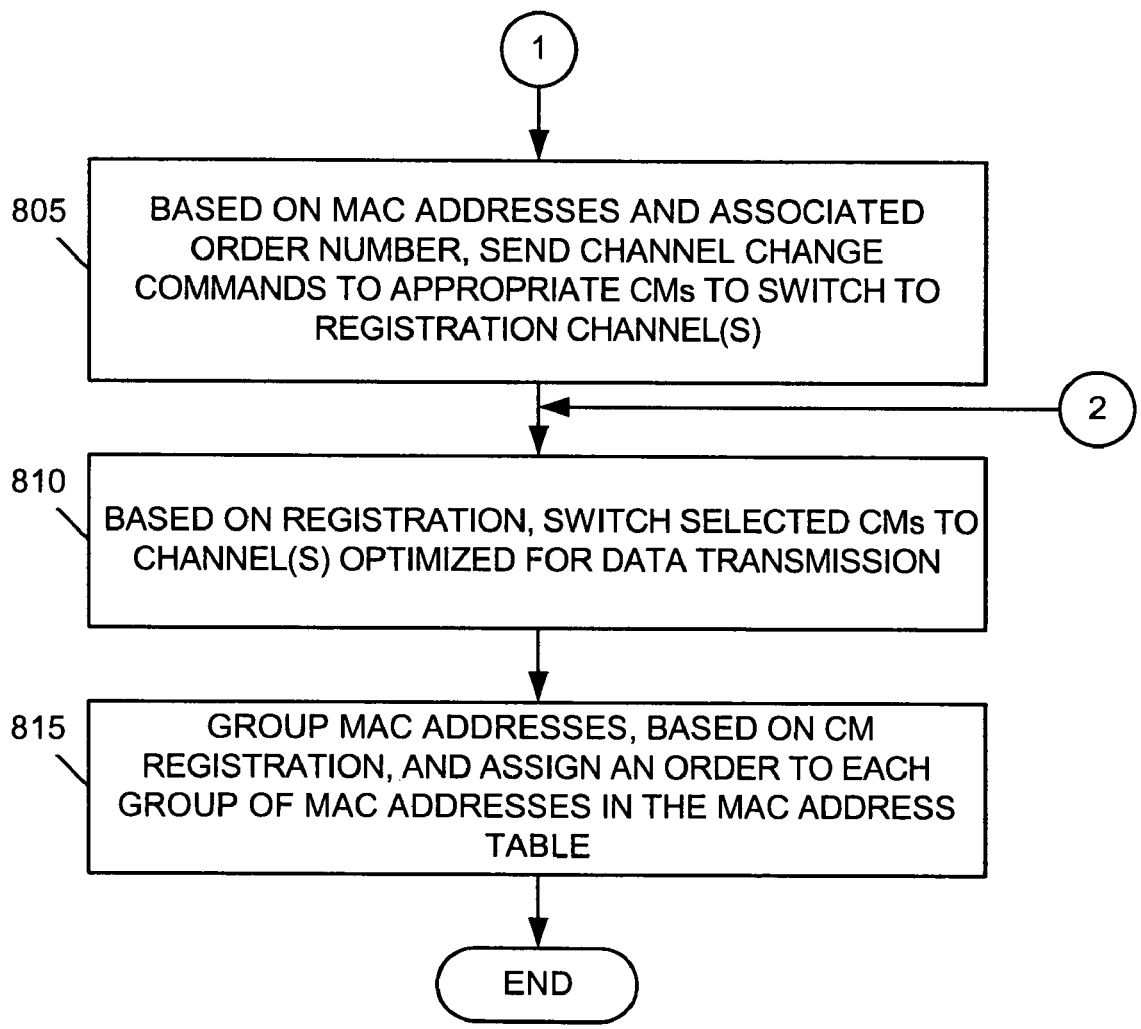

FIGS. 7 and 8 illustrate an exemplary process for ordering CM initialization and registration, such as, for example, subsequent to a CMTS re-boot, in a manner consistent with the principles of the invention. As one skilled in the art will appreciate, the method exemplified by FIG. 7 can be implemented as a sequence of instructions and stored in memory 210 of CMTS 115 for execution by processing unit(s) 205.

The exemplary process may begin after a CMTS re-boot, for example, with CMTS 115 periodically broadcasting multiple UCDs on one or more downstream channels 405, with each of the multiple UCDs identifying different upstream channels 410 that may be used by CMs 130 [act 705]. For example, each UCD 500 may include a different upstream channel identifier 515. Each UCD may further include different channel/burst descriptors 535.

CMTS 115 may also transmit a bandwidth allocation message for each upstream channel 410 [act 710]. Each bandwidth allocation message may define transmission opportunities on an associated upstream channel 410, such as, for example, available time slots over which a CM 130 may transmit. CMs 130 receiving the multiple UCDs may select a UCD and transmit initial maintenance (IM) messages on an upstream channel identified by the selected UCD.

CMTS 115 may receive multiple IM messages, each of which includes an upstream channel request, from CMs 130 [act 715]. CMTS 115 may retrieve MAC addresses from each of the IM messages [act 720]. Based on the retrieved MAC addresses, CMTS 115 may determine whether each CM 130 from which it received a message is a "new" CM 130 [act 725]. A "new" CM 130 may be a CM 130 that CMTS 115 has not seen before, or a CM 115 that had a degraded bit error rate (BER) prior to the CMTS re-boot. CMTS 115 may compare the MAC address retrieved from each IM message with MAC addresses 615 stored in table 605 to determine whether a given CM 130 is a "new" CM. If a CM 130 is a "new" CM, then CMTS 115 may assign a robust upstream channel (e.g., a channel using quadrature phase shift keying (QPSK) instead of 16 quadrature amplitude modulation (16QAM) modulation) to the "new" CM via an IM response message [act 730]. The exemplary process may then continue at act 810 below.

For CMs 130 that are not "new," CMTS 115 may assign initial upstream channels to each requesting CM 130 according to order numbers 620 associated with each CM 130's MAC address in table 605 [act 735]. To assign initial upstream channels, CMTS 115 may retrieve an order number 620 from MAC address table 605 based on a given CM's MAC address 615. CMTS 115 may then retrieve a VCID 625 from VCID table 610 using the retrieved order number 620. CMTS 115 may send IM responses, each including a retrieved VCID 625, in the order specified by the retrieved order numbers 620 [act 740]. For example, CMTS 115 may send an IM response to a CM 130 with an order number of 1, before sending an IM response to a CM 130 with an order number of 2. CMs 130 receiving the IM reponses may initialize on the upstream channels identified in the IM responses.

As illustrated in FIG. 8, for CMs 130 that have been assigned initial upstream channels, CMTS 115 may send channel change commands to these CMs 130 to switch to one or more channels reserved for registration in an order indicated by an order number 620 associated with a MAC address 615 of each CM 130 [act 805]. Each CM 130 that receives a channel change command may register with CMTS 115 on the new upstream registration channel. Such registration may include a Quality of Service (QoS) request from the CM. For example, CMs 130 acting as message transferring agents (MTAs) may request channels optimized for packet-switched transmission for transmitting data, such as, for example, Voice Over IP. Registration may further include a priority request indicating that a CM is requesting high priority service.

Based on CM registration, CMTS 115 may switch selected CMs 130 to upstream channels optimized for packetized data transmission [act 810]. For example, CMTS 115 may send channel change commands to CMs 130 that have requested upstream channels optimized for packet-switched data transmission. The selected CMs 130 may switch to the upstream channels identified in the channel change commands. CMTS 115 may then group MAC addresses 615 in MAC address table 605, based on CM registration, and assign an order to each group of MAC addresses in MAC address table 605 [act 815]. For example, CMs 130 acting as MTAs may be grouped together and assigned an order number of 1, whereas other CMs 130 may be grouped together and assigned an order number of 2. Therefore, if CMTS 115 re-boots, CMs 130 acting as MTAs may be initialized and registered prior to the other CMs 130.

CONCLUSION

Consistent with the principles of the present invention, exemplary processes may order the initialization and registration of CMs after a CMTS re-boot that may occur due to system failure and/or power outage. CMs may be grouped together prior to CMTS re-boot based on, for example, quality of service (QoS) requirements of the CMs, with CMs of like QoS requirements possibly being grouped together. Some groups of CMs may be designated as deserving higher priority service than other groups of CMs and may, thus, initialize and register before other groups of CMs. Through ordering the initialization and registration process, consistent with the principles of the invention, channel contention may be reduced and the time involved in resuming CM service to respective customers subsequent to CMTS re-boot may also be reduced.

The foregoing description of embodiments of the present invention provides illustration and description, but is not intended to be exhaustive or to limit the invention to the precise form disclosed. Modifications and variations are possible in light of the above teachings or may be acquired from practice of the invention. For example, certain portions of the invention have been described as executed as instructions by one or more processing units. However, implementations, other then software implementations, may be used with the present invention, including, for example, hardware implementations such as application specific integrated circuits, field programmable gate arrays, or combinations of hardware and software. While a series of acts has been described in FIGS. 7-8, the order of the acts may vary in other implementations consistent with the present invention. Also, non-dependent acts may be performed in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method of allocating upstream resources to a plurality of cable modems, comprising:
   receiving initial upstream channel requests from the plurality of cable modems;
   retrieving data from the initial upstream channel requests;
   grouping the plurality of cable modems into a plurality of groups based on quality of service requirements of each of the cable modems;
   ordering allocation of said upstream resources to each of the plurality of cable modems based on the retrieved data and based on the group to which each of the cable modems belongs; and
   allocating said upstream resources to each of the cable modems based on the ordering.

2. The method of claim 1, where allocating said upstream resources comprises:
   assigning initialization channels of the upstream resources to each of the plurality of cable modems based on the grouping of the plurality of cable modems.

3. The method of claim 1, where allocating said upstream resources comprises:
   assigning registration channels of the upstream resources to each of the plurality of cable modems based on the grouping of the cable modems.

4. The method of claim 1, where a first group of the plurality of groups comprises message transferring agents.

5. The method of claim 1, further comprising:
   designating a first group of the plurality of groups as being allocated the upstream resources before other, different groups of the plurality of groups.

6. The method of claim 5, further comprising:
designating a second group of the plurality of groups as being allocated the upstream resources subsequent to the first group.

7. A cable modem termination system (CMTS), comprising:
a memory to store instructions; and
a processing unit to execute the instructions in the memory to:
group a plurality of cable modems (CMs) into a plurality of groups based on quality of service requirements of each of the cable modems,
re-boot the CMTS,
receive, after re-booting, initial upstream channel requests from the plurality of CMs,
retrieve data from each of the requests, and
determine an order for allocating upstream resources to each of the plurality of CMs based on the retrieved data and the group to which each of the CMs belongs.

8. The system of claim 7, where the processing unit is further to execute the instructions in the memory to:
allocate initialization channels of the upstream resources to each of the plurality of CMs based on the grouping of the plurality of CMs.

9. The system of claim 7, where the processing unit is further to execute the instructions in the memory to:
allocate registration channels of the upstream resources to each of the plurality of CMs based on the grouping of the CMs.

10. The system of claim 7, where a first group of the plurality of groups comprises message transferring agents.

11. The system of claim 7, where the processing unit is further to execute the instructions in the memory to:
designate the first group of the plurality of groups to receive allocation of upstream resources before other groups of the plurality of groups.

12. The system of claim 11, where the processing unit is further to execute the instructions in the memory to:
designate a second group of the plurality of groups as being allocated the upstream resources subsequent to the first group.

13. A method of allocating upstream resources in a cable modem system, comprising:
receiving upstream resource requests from a plurality of cable modems, each of the resource requests comprising an address associated with a cable modem of the plurality of cable modems;
retrieving data from each of the requests;
determining an order that the upstream resources are to be assigned to each of the plurality of cable modems based on the retrieved data and the address of each of the resource requests; and
allocating the upstream resources based on the determined order.

14. The method of claim 13, where the address comprises a medium access control (MAC) address.

15. The method of claim 13, further comprising:
grouping the plurality of cable modems into a plurality of groups.

16. The method of claim 15, where ordering the allocation of upstream resources comprises allocating the upstream resources to each of the plurality of cable modems based on a group of the plurality of groups to which each of said cable modems belongs.

17. The method of claim 15, where the grouping of the plurality of cable modems comprises grouping the plurality of cable modems into the plurality of groups based on quality of service requirements of each of the cable modems.

18. A cable modem termination system, comprising:
a memory to store instructions;
a communication interface to receive upstream resource requests from a plurality of cable modems, each of the resource requests comprising an address associated with a cable modem of the plurality of cable modems; and
a processing unit to execute the instructions in the memory to:
retrieve data from each of the requests, and
determine an order for allocating upstream resources to each of the plurality of cable modems based on the retrieved data and address of each of the resource requests.

19. The system of claim 18, where the address comprises a medium access control (MAC) address.

20. The system of claim 18, where the processing unit is further to execute the instructions in the memory to:
group the plurality of cable modems into a plurality of groups.

21. The system of claim 20, where the processing unit is further to execute the instructions in the memory to:
allocate the upstream resources to each of the plurality of cable modems based on a group of the plurality of groups to which each cable modem belongs.

22. The system of claim 20, where the processing unit is further to execute the instructions in the memory to:
group the plurality of cable modems into the plurality of groups based on quality of service requirements of each of the cable modems.

23. A method of initializing cable modems subsequent to a cable modem termination system re-boot, comprising:
receiving initial upstream channel requests from a plurality of said modems;
retrieving first data from each of the requests; and
determining an order in which to assign upstream channels to each of the plurality of modems based on the retrieved first data.

24. The method of claim 23, where the first data comprises a medium access control (MAC) address.

25. The method of claim 23, further comprising:
grouping the plurality of modems into a plurality of groups.

26. The method of claim 25, wherein where grouping the plurality of cable modems comprises grouping the plurality of modems into the plurality of groups based on quality of service requirements of each of the modems.

27. The method of claim 25, where a first group of the plurality of groups comprise message transferring agents.

28. The method of claim 25, further comprising:
designating a first group of the plurality of groups as receiving allocation of upstream resources before other said groups of the plurality of groups.

29. The method of claim 28, further comprising:
designating a second group of the plurality of groups as being allocated said upstream resources subsequent to the first group.

30. A system for allocating upstream resources to a plurality of cable modems subsequent to a cable modem termination system (CMTS) re-boot, comprising:
a processor to:
group the plurality of cable modems into a plurality of groups; and
identify an order, subsequent to the CMTS re-boot, that said upstream resources are to be allocated to each of the plurality of cable modems based on the group to which each of the cable modems belongs and based on data retrieved from the plurality of cable modems.

* * * * *

UNITED STATES PATENT AND TRADEMARK OFFICE
CERTIFICATE OF CORRECTION

| | | |
|---|---|---|
| PATENT NO. | : 7,991,888 B1 | Page 1 of 1 |
| APPLICATION NO. | : 10/667978 | |
| DATED | : August 2, 2011 | |
| INVENTOR(S) | : Beser | |

It is certified that error appears in the above-identified patent and that said Letters Patent is hereby corrected as shown below:

Claim 26, Column 10, Line 40 should read: "26. The method of claim 25, where grouping the"

Signed and Sealed this
Fifteenth Day of November, 2011

David J. Kappos
*Director of the United States Patent and Trademark Office*